July 13, 1943.  O. J. POUPITCH  2,324,269
FASTENING DEVICE
Filed April 8, 1942
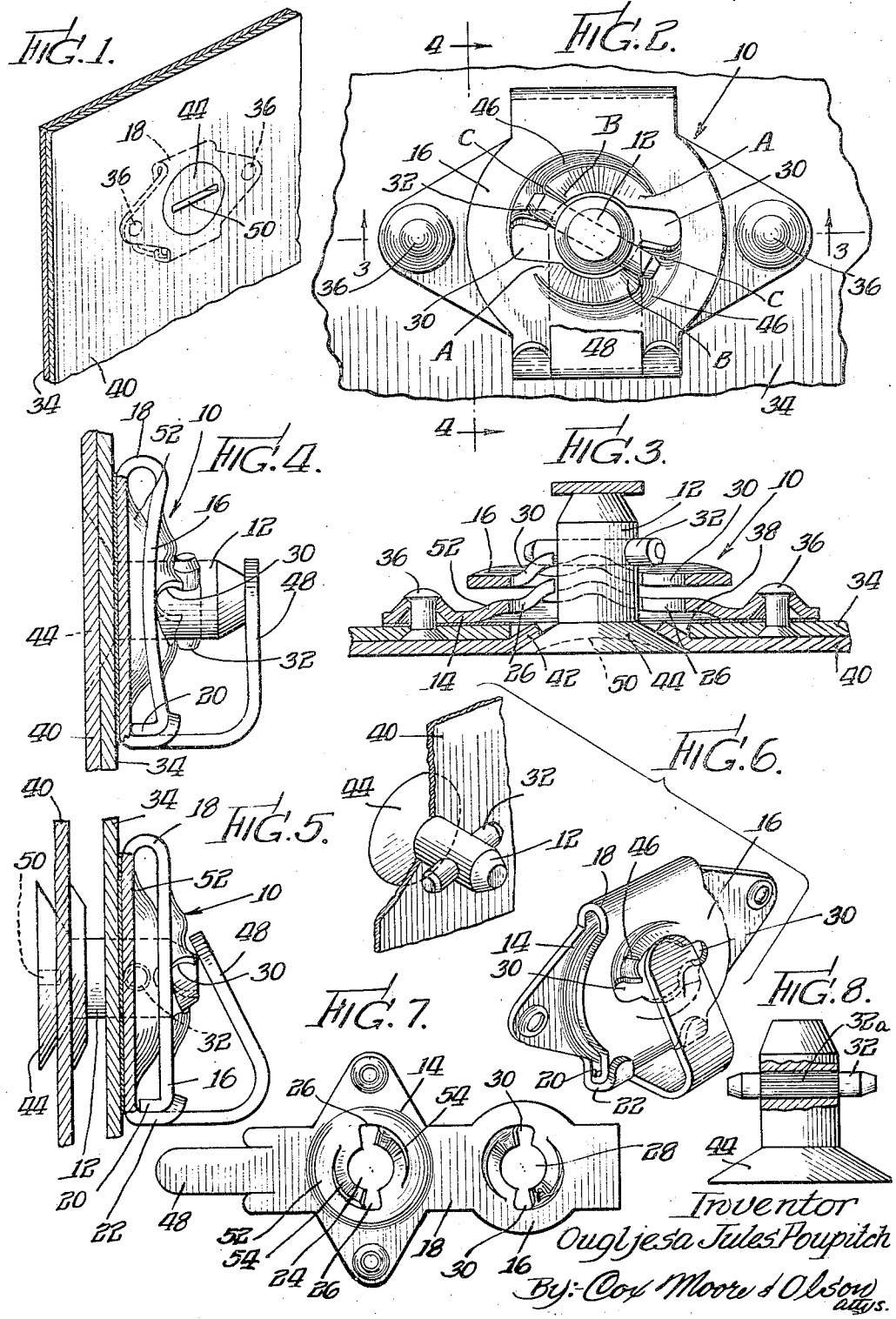
Inventor
Ougljesa Jules Poupitch
By: Cox Moore & Olson
attys.

Patented July 13, 1943

2,324,269

UNITED STATES PATENT OFFICE 2,324,269

FASTENING DEVICE

Ougljesa Jules Poupitch, Chicago, Ill., assignor to Illinois Tool Works, Chicago, Ill., a corporation of Illinois Application April 8, 1942, Serial No. 438,204

8 Claims. (Cl. 24—221)

This invention relates generally to fastening devices and more particularly to fastening devices of the type employed for detachably securing work pieces together such as cowling parts and the like.

Experience has shown that fastening devices of the type commonly referred to as cowl fasteners, to be used for securing airplane cowling parts in place, must be capable of withstanding severe strains and stresses without the slightest tendency of fatigue and breakage. Despite the fact that cowl fasteners of the type contemplated by the present invention include as an element thereof a relatively light weight sheet metal locking part, these sheet metal parts must be so designed as to withstand extremely high transverse pressures without impairing their locking efficiency. Also, such sheet metal locking parts must be capable of withstanding severe conditions of vibration over an extended period of time without the slightest tendency toward fracture or metal fatigue. Furthermore, the sheet metal fastener part referred to above is usually secured to the work surface by means of rivets and under no circumstances should these rivets be subjected to transverse stresses which would have a tendency to cause the shearing or fracture thereof. In other words, fasteners of the type forming the subject matter of the present invention must be so designed as to meet the highest standards for locking efficiency under the most extreme service conditions. It is therefore an important object of the present invention to provide a fastener device which will meet the operating requirements referred to above and which can be produced at minimum cost by the practice of conventional machine shop methods.

More specifically, the present invention contemplates the provision of a fastener as set forth above in which a sheet metal locking part or plate provided with cam surfaces is so designed and supported as to positively preclude the flattening of such surfaces when subjected to extremely high transverse pressures.

It is another object of the present invention to provide in combination with a sheet metal locking element or plate novel and effective means for automatically causing the ejection of a locking stud and thereby insure complete disengagement of the lateral lug or cross pin of the stud from said locking plate.

The foregoing and other objects and advantages will be more apparent from the following detailed description when considered in connection with the accompanying drawing wherein:

Figure 1 is a perspective view illustrating the manner in which the fastener of the present invention is employed to detachably secure two plates together;

Figure 2 is an enlarged elevational view of the fastener as observed from the left of Figure 1;

Figure 3 is a central vertical sectional view taken substantially along the line 3—3 of Figure 2;

Figure 4 is a vertical sectional view taken substantially along the line 4—4 of Figure 2;

Figure 5 is a sectional view similar to Figure 4 disclosing the disengagement or ejection of the locking stud and the consequent separation of the work pieces;

Figure 6 is a perspective view of the stud and sheet metal locking element disclosed in exploded arrangement;

Figure 7 discloses a blank before it has been folded or formed into a completed sheet metal locking device; and Figure 8 is a side elevational view of a stud and cross pin, a portion of the stud body being broken away to expose the intermediate ribbed portion of the cross pin.

Referring now to the drawing it will be observed that like numerals have been employed to designate similar parts throughout the various figures. The fastener contemplated by the present invention includes a sheet metal locking device or element designated generally by the numeral 10 and a cooperating locking stud 12 adapted for telescopic association therewith. The fastener 10 may be blanked from flat sheet stock as illustrated in Figure 7. It includes a base portion or plate 14 and a superimposing or overlying locking plate 16. The locking plate 16 forms an integral extension of the base portion or plate 14 and is connected thereto by a connecting or spacing section 18. This connecting section 18 serves to support and space the locking plate 16 from the base portion 14 along one margin, the opposite margin of the plate 16 being supported by a spacing member or flange 20. In order to counteract any tendency for spreading or distortion of the associated parts when the fastener is placed under stress, the base portion 14 is formed with an extension or flange 22 which overlies the flange 20 as well as a portion of the outer surface of the locking plate 16.

The base portion 14 is provided with a central aperture 24 which communicates with oppositely disposed radial recesses 26. The locking plate 16 is similarly provided with a central aperture or opening 28 which communicates with oppositely disposed radial recesses 30. The recesses 30 superimpose and register with the recesses 26 when the locking plate 16 is folded so as to occupy the position shown in Figures 1 to 6, inclusive. These radial recesses 26–30 are designed to accommodate the opposite extremities of a cross pin 32.

The sheet metal fastener 10 is adapted to be secured to the surface of a work piece or plate 34 by means of rivets 36. The work piece 34, as illustrated in Figure 3, is provided with an aperture 38 of sufficient diameter to permit the insertion of the cross pin 32. A work piece or cowling part 40 carries the stud 12 and is suitably countersunk at 42 to accommodate the conical surface of the head 44 of the stud. The cross pin 32 is inserted within the stud 12 after the stud has been telescopically associated with the cowling part 40. The intermediate portion of the cross pin 30, designated by the numeral 32a, is preferably of slightly larger diameter than the aperture formed in the stud to receive the pin. This intermediate portion 32a is also serrated or ribbed so that when the pin 32 is driven into its complementary hole in the stud, these ribs will firmly embed themselves within the material of the stud and thus the cross pin will be firmly secured against loosening or inadvertent longitudinal shifting within the stud. The material of the cowling part 40 encircling the stud shank has a diameter which is sufficiently smaller than the length of the cross pin 32 so as to prevent the stud from being completely disengaged from the cowling part 40.

When the cowling part 40 is to be attached to the plate 34, the stud 12 is telescopically associated with the aperture 38 and the opposite extremities of the cross pin 32 are brought into registration with the radial recesses 26–30. Axial movement of the stud brings each extremity of the cross pin 32 into position immediately adjacent the low point A of a cam member 46. These cam members 46 are formed by extruding the metal of the locking plate 16 outwardly. Rotation of the opposite extremities of the cross pin 32 from the points A in a counterclockwise direction, as viewed in Figure 2, ultimately brings these extremities to the high point B of the cams 46 and this subjects the locking plate 16 to considerable stress. After passing over the high points B, the cross pin extremities become lodged within indentations or pockets C. The locking plate 16 is still under considerable stress, as illustrated in Figure 4. With the parts in this position the plates 34 and 40 are firmly secured together even under the most severe conditions of vibration and stress.

At this point attention is directed to a stud ejecting spring 48 which forms an integral continuation of the flange 22. The spring 48, like the remaining portion of the sheet metal locking part 10, is preferably hardened and tempered so as to possess the required degree of stiff spring resiliency. The normal position of the ejecting spring 48 is shown in Figure 5. As the stud 12 is telescopically associated with the sheet metal part 10, the extremity of the stud forces the spring 48 from the position shown in Figure 5 to the position shown in Figure 4. The stud head 44 is provided with a cross slot 50 for receiving a screw driver blade and to loosen the stud it is only necessary to apply rotation in a clockwise direction as viewed in Figure 2. The locking plate 16 springs back to its normal flat position, as shown in Figure 5, and when the extremities of the cross pin are brought into registration with the radial recesses 30, the spring 48 shifts to the position shown in Figure 5, and thereby automatically ejects the cross pin from the locking plate. This stud ejecting arrangement is of particular practical significance in instances where a plurality of fasteners must be released in order to permit the detachment of a cowling part or the like.

Particular attention is directed to the structure of the base plate in the immediate vicinity of its central aperture 24. The entire area surrounding the aperture 24 is dished or dimpled so as to present a dome-like structure 52. This dome-like structure 52 supports abutment sections 54 which are positioned immediately beneath and present counterparts of the cams 46. There is sufficient space between the underside of the cams 46 and the upper surfaces of the abutments 54 to permit flexing of the locking plate 16 under the influence of the cross pin 32. However, any tendency for the cam members 46 per se to flatten due to the pressure exerted thereagainst by the cross pin 32 is opposed by the complementary abutment members 54. The dome structure 52 also cooperates with the abutments 54 in resisting tendencies for the cams 46 to collapse. In order for fasteners of the type herein described to be used for aircraft, the cams must be capable of withstanding very high axial pressures. By employing the abutments 54 immediately beneath the cam members, fastener devices constructed in accordance with the teachings of the present invention have satisfied the most rigid pressure test requirements.

It will be apparent from the foregoing description that the present invention contemplates a fastener for cowling parts and the like which is extremely simple in construction and very efficiently operable in use. Fasteners constructed in accordance with the teachings of the present invention have been subjected to the most severe conditions of use without showing any signs of functional impairment. By having the radial recesses 30 positioned centrally with respect to the locking plate 16, said plate is free to flex as shown in Figure 4. That is to say, even though the cams 46 are substantially rigid, the portion of the locking plate or body in the vicinity of the recesses 30 is resilient.

The invention obviously is not limited to the features of structural design disclosed in the drawing but is capable of other changes and modifications without departing from the spirit and scope of the claims appended hereto.

The invention is hereby claimed as follows:

1. A sheet metal fastening device having a base portion adapted to be secured to a supporting surface, a locking member carried by said base portion and normally spaced from the plane defined by said base portion, said locking member being adapted to accommodate a rotary stud equipped with a lateral cam engaging surface and carried by a work member adapted to be detachably associated with said support, a cam associated with the locking member adapted to be engaged by the cam engaging surface of the stud, and abutment means positioned beneath said cam and adapted to be engaged by the underside thereof for limiting the extent to which said cam may be shifted under the influence of a lateral cam engaging surface of a stud, said abutment means in the vicinity of the high point of said cam being spaced from the plane of the base portion and positioned in relatively close proximity with respect to the underside of the cam in the aforesaid vicinity.

2. A sheet metal fastening device having a base portion adapted to be secured to a supporting surface, a locking member carried by said base portion and normally spaced from the plane defined by said base portion, said locking member being adapted to accommodate a rotary stud equipped with a lateral cam engaging surface and carried by a work member adapted to be engaged by the cam engaging surface of the stud, and abutment means positioned beneath said cam and having an abutment surface generally conforming in contour with the underside of the cam to limit the extent to which said cam may be shifted under the influence of a lateral cam engaging surface of the stud.

3. In a fastener, a female member apertured to receive a stud and consisting of a single piece of sheet metal providing a base plate having attaching tabs at its ends, a lateral projection from one side of said base plate folded over the base plate to provide a resilient locking plate spaced from the base plate, and a resilient projection extending from the base plate and folded over the locking plate to engage the stud.

4. In a fastening device for detachably securing work surfaces together, a female member for association with the surface of one work part and adapted to receive a fastening stud having diametrically opposite lateral projections, said female member consisting of a single piece of sheet metal folded upon itself and providing an apertured base plate having fastening tabs at its ends, an apertured spring plate bridging the base plate between said tabs, and spacing pieces extending between the ends of the spring plate and the side edges of the base plate to hold the plates in separated relation while permitting the central portion of the spring plate to be drawn towards the base plate by the stud, the spring plate containing a transverse slot which permits the passage of the projections of the stud and also increases the resiliency of the central portion of the spring plate, the bridging of the base plate by the spring plate being such as to relieve against shear stress at the point of fastening.

5. A sheet metal fastening device having a base portion adapted to be secured to a support, a locking plate normally spaced from the plane of said base portion and apertured to accommodate a rotary stud equipped with a lateral cam engaging surface and carried by a member adapted to be detachably associated with said support, a pair of cams associated with the locking plate in the vicinity of the aperture thereof adapted to be engaged by the cam engaging surface of a stud, and abutment means positioned beneath each of said cams and adapted to be engaged by the underside thereof for limiting the extent to which said cams may be shifted under the influence of a cam engaging surface of a stud, said abutment means in the vicinity of the high point of each cam being spaced from the plane of the base portion and positioned in relatively close proximity with respect to the underside of the cam in the aforesaid vicinity.

6. A sheet metal fastening device having a base portion adapted to be secured to a support, a locking plate normally spaced from the plane of said base portion and apertured to accommodate a rotary stud equipped with a lateral cam engaging surface and carried by a member adapted to be detachably associated with said support, a cam associated with the locking plate adapted to be engaged by the cam engaging surface of a stud, and stud engaging and rotation resisting spring means integral with one of the aforesaid elements.

7. A sheet metal fastening device having a base portion adapted to be secured to a support, a locking plate normally spaced from and superimposing said base portion, said locking plate being centrally apertured to accommodate a rotary stud equipped with a lateral lug and carried by a member adapted to be detachably associated with said support, the material of the locking plate in the vicinity of said central aperture presenting a cam surface for cooperation with said lateral lug, and a stud engaging and rotation resisting spring integral with one of the aforesaid parts and positioned externally of said cam surface.

8. A sheet metal fastening device having a base portion adapted to be secured to a support, a locking plate normally spaced from and superimposing said base portion, said locking plate being centrally apertured to accommodate a rotary stud equipped with a lateral lug and carried by a member adapted to be detachably associated with said support, the material of the locking plate in the vicinity of said central aperture presenting a cam surface for cooperation with said lateral lug, and a stud ejecting spring formed integral with one of the aforesaid parts and superimposing the aperture in the locking plate.

OUGLJESA JULES POUPITCH.